(12) United States Patent
Zeng

(10) Patent No.: US 6,964,099 B1
(45) Date of Patent: Nov. 15, 2005

(54) GARDENING SHEARS HAVING TWO PRUNING EFFECTS

(76) Inventor: Min Zheng Zeng, No. 13, Lane 525, Sec. 1, Zhangnan Rd., Nantou City, Nantou County (TW) 540

( * ) Notice: Subject to any disclaimer, the term of this patent is extended or adjusted under 35 U.S.C. 154(b) by 0 days.

(21) Appl. No.: 10/923,099

(22) Filed: Aug. 19, 2004

(51) Int. Cl.[7] .................. B26B 13/04; B25B 7/32; B24B 7/02
(52) U.S. Cl. ............... 30/254; 30/260; 7/135; 81/303
(58) Field of Search .............. 30/254, 260, 341, 30/258, 256, 261, 340, 232, 233, 231, 160, 30/161, 342, 343, 344, 262; 81/427.5, 416, 81/303–305, 311; 7/135, 158, 118, 127, 129, 7/131

(56) References Cited

U.S. PATENT DOCUMENTS

| | | | | |
|---|---|---|---|---|
| 1,321,745 A | * | 11/1919 | Howard | 7/134 |
| 2,446,022 A | * | 7/1948 | Peterson | 81/305 |
| 2,651,227 A | * | 9/1953 | Kennington, Jr. | 81/305 |
| 4,942,637 A | * | 7/1990 | Yeang-Yai | 7/135 |
| 5,987,755 A | * | 11/1999 | Shih | 30/262 |
| 6,023,805 A | * | 2/2000 | Lin | 7/128 |
| 6,389,626 B1 | * | 5/2002 | Hung | 7/128 |
| 6,393,703 B1 | * | 5/2002 | Wu | 30/232 |
| 6,643,935 B1 | * | 11/2003 | Lowe et al. | 30/142 |
| 6,647,835 B1 | * | 11/2003 | Tseng | 81/423 |
| 6,786,117 B1 | * | 9/2004 | Tseng | 81/303 |
| 6,860,018 B2 | * | 3/2005 | Schneider et al. | 30/262 |
| 2002/0124414 A1 | * | 9/2002 | Yang | 30/254 |
| 2002/0124415 A1 | * | 9/2002 | Mizutani et al. | 30/261 |

* cited by examiner

Primary Examiner—Allan N. Shoap
Assistant Examiner—Ghassem Alie
(74) Attorney, Agent, or Firm—Charles E. Baxley

(57) ABSTRACT

A pair of gardening shears include a blade assembly including two blades, and a handle assembly pivotally mounted on the blade assembly and including a first handle and a second handle. Thus, the gardening shears have two blades each having two cutting portions having different shapes to perform different cutting functions, so that the gardening shears provide two different pruning actions so as to satisfy the user's practical requirements, thereby enhancing the versatility of the gardening shears.

8 Claims, 6 Drawing Sheets

GARDENING SHEARS HAVING TWO PRUNING EFFECTS

BACKGROUND OF THE INVENTION

1. Field of the Invention

The present invention relates to a pair of gardening shears, and more particularly to a pair of gardening shears having two different pruning effects.

2. Description of the Related Art

A conventional pair of gardening (or pruning) shears comprises two handles pivotally connected with each other, and a compression spring mounted between the two handles. Thus, the user's one hand can exert a force to hold the two handles to compress the compression spring, so that the front cutting blades of the two handles are moved toward each other so as to cut a flower, branch or the like therebetween. However, the conventional gardening shears have cutting blades having a determined shape to perform a determined cutting function, so that the gardening shears only provide a single pruning action and cannot satisfy the user's practical requirements, thereby limiting the versatility of the conventional gardening shears.

SUMMARY OF THE INVENTION

The present invention is to mitigate and/or obviate the disadvantage of the conventional gardening shears.

The primary objective of the present invention is to provide a pair of gardening shears having two different pruning effects.

Another objective of the present invention is to provide a pair of gardening shears, wherein the gardening shears have two blades each having two cutting portions having different shapes to perform different cutting functions, so that the gardening shears provide two different pruning actions so as to satisfy the user's practical requirements, thereby enhancing the versatility of the gardening shears.

A further objective of the present invention is to provide a pair of gardening shears, wherein the first handle and the second handle are pivoted relative to the two blades to expose the first cutting portion or the second cutting portion of each of the two blades, so that the user can change the first cutting portion and the second cutting portion of each of the two blades easily and conveniently, thereby facilitating the user operating the gardening shears.

In accordance with the present invention, there is provided a pair of gardening shears, comprising:

a blade assembly including two blades pivotally connected with each other; and a handle assembly pivotally mounted on the blade assembly and including a first handle having an end portion pivotally mounted on the two blades of the blade assembly, and a second handle having an end portion pivotally mounted on the two blades of the blade assembly and pivotally connected to the end portion of the first handle.

Further benefits and advantages of the present invention will become apparent after a careful reading of the detailed description with appropriate reference to the accompanying drawings.

DETAILED DESCRIPTION OF THE INVENTION

Figure 1:
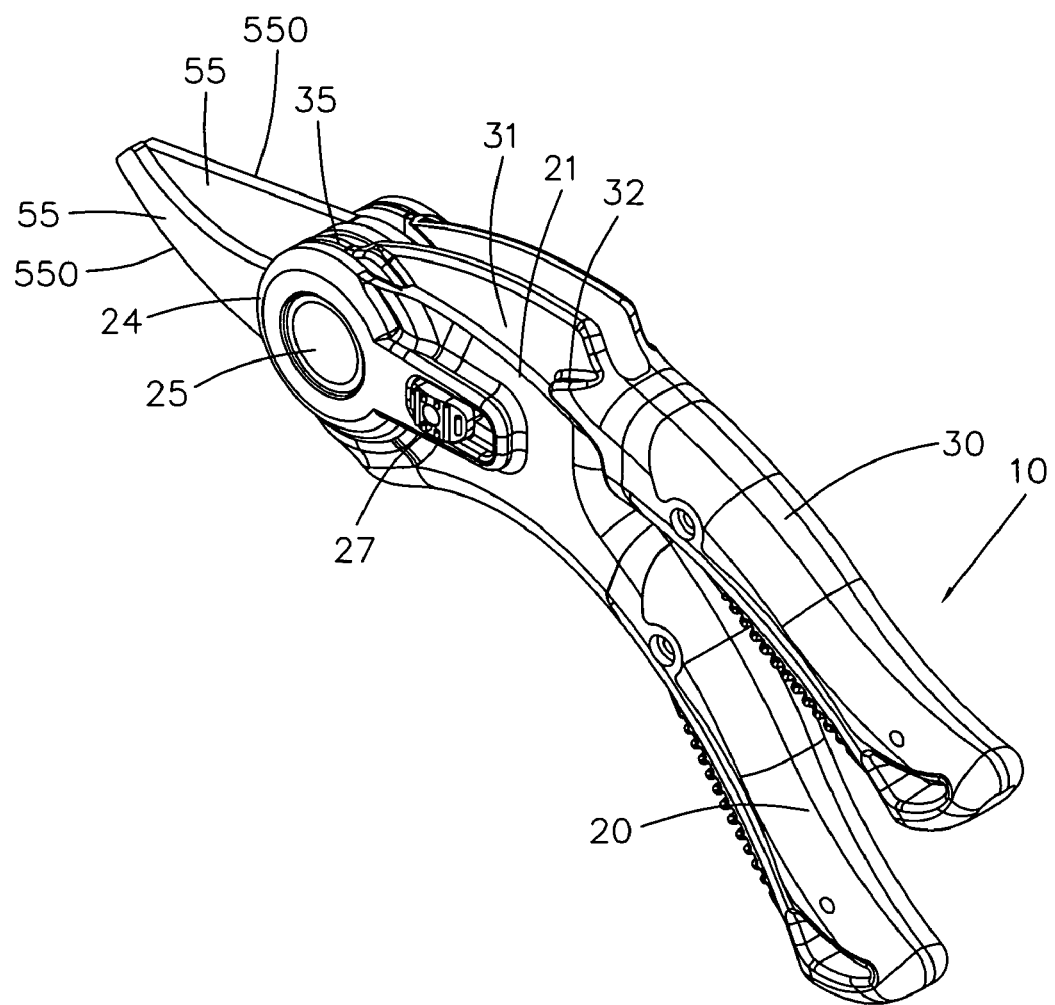
FIG. 1 is a perspective view of a pair of gardening shears in accordance with the preferred embodiment of the present invention.
Figure 2:
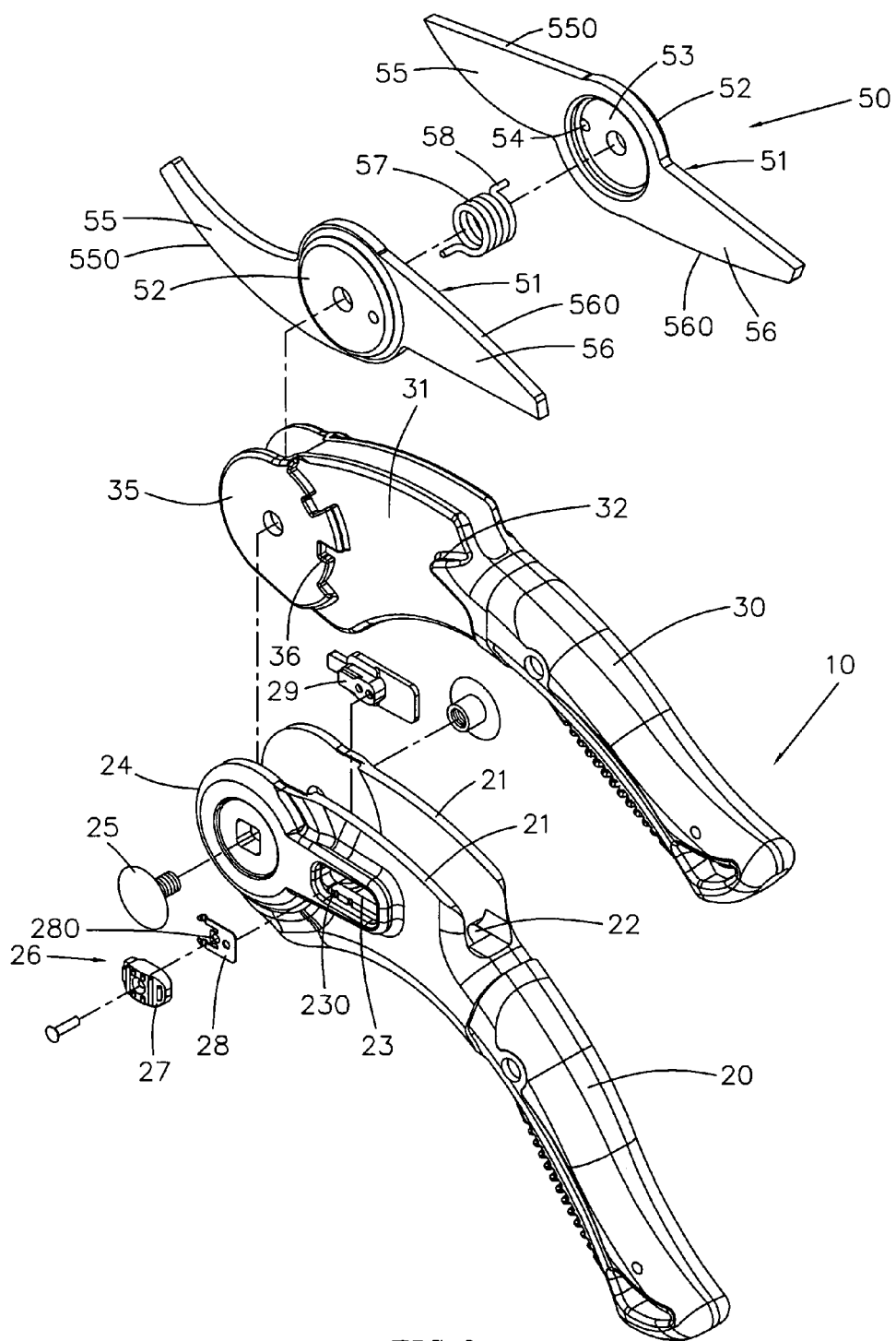
FIG. 2 is an exploded perspective view of the gardening shears as shown in FIG. 1.
Figure 3:
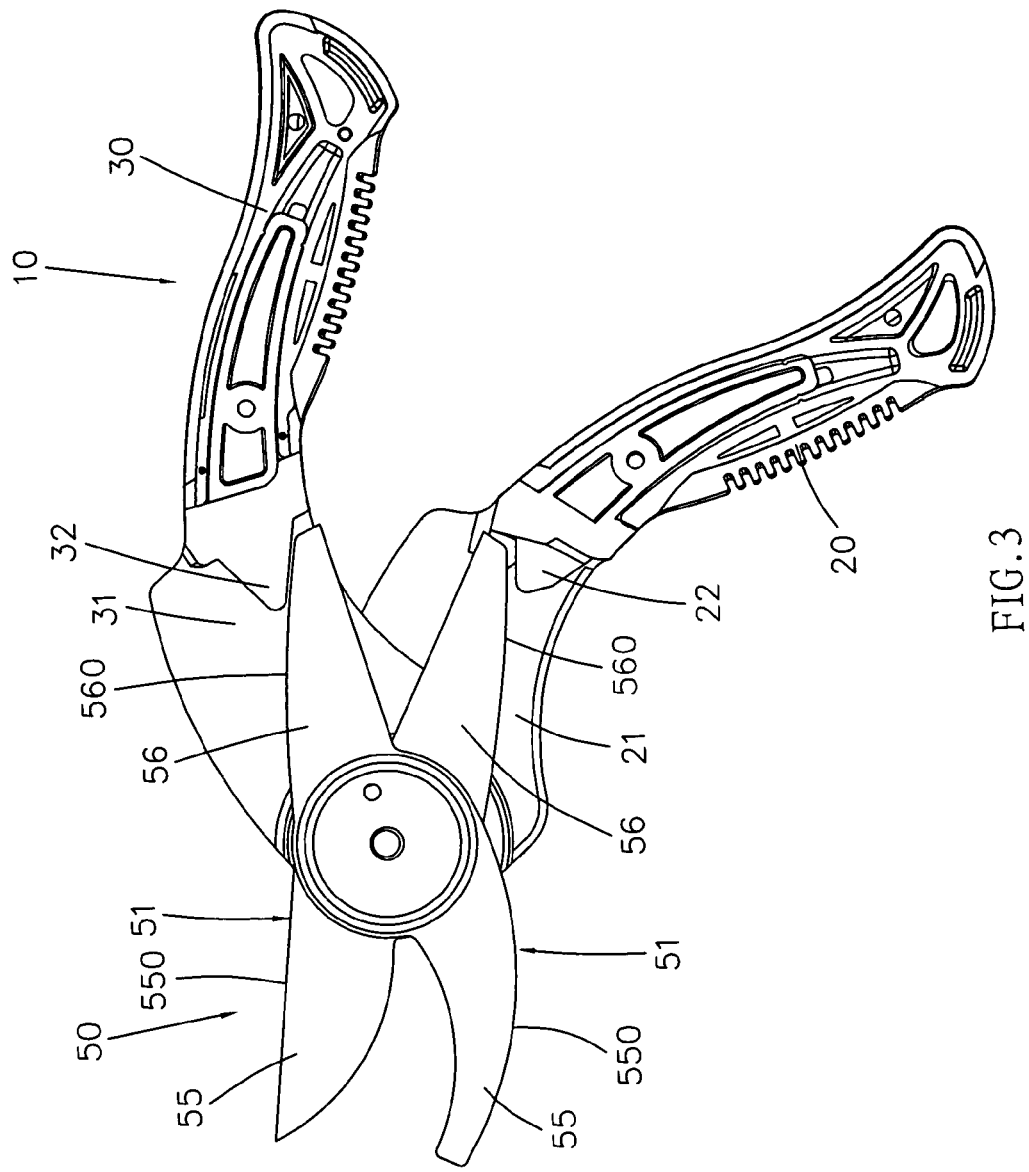
FIG. 3 is a plan view of the gardening shears as shown in FIG. 1.

Referring to the drawings and initially to FIGS. 1–3, a pair of gardening shears in accordance with the preferred embodiment of the present invention comprises a blade assembly 50 including two blades 51 pivotally connected with each other, and a handle assembly 10 pivotally mounted on the blade assembly 50 and including a first handle 20 having an end portion pivotally mounted on the two blades 51 of the blade assembly 50, and a second handle 30 having an end portion pivotally mounted on the two blades 51 of the blade assembly 50 and pivotally connected to the end portion of the first handle 20.

Figure 5:
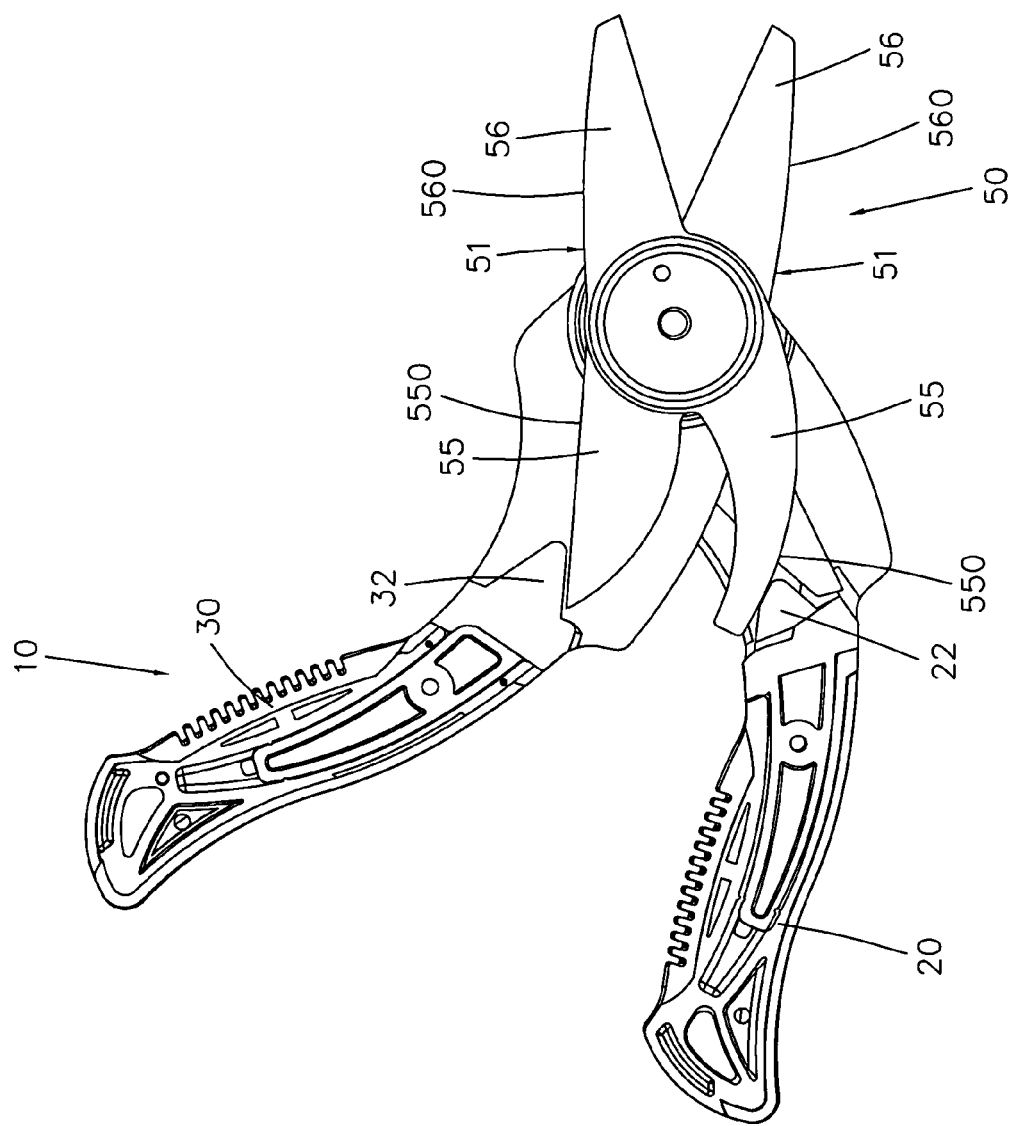
FIG. 5 is a plan view of the gardening shears as shown in FIG. 1.

Each of the two blades 51 of the blade assembly 50 has a first end formed with a first cutting portion 55 and a second end formed with a second cutting portion 56. Thus, the handle assembly 10 is pivotable on the blade assembly 50 between a first position as shown in FIG. 3 where each of the first handle 20 and the second handle 30 of the handle assembly 10 is rested on the second cutting portion 56 of a respective one of the two blades 51 of the blade assembly 50 to expose the first cutting portion 55 and a second position as shown in FIG. 5 where each of the first handle 20 and the second handle 30 of the handle assembly 10 is rested on the first cutting portion 55 of a respective one of the two blades 51 of the blade assembly 50 to expose the second cutting portion 56.

The first cutting portion 55 of each of the two blades 51 of the blade assembly 50 has a side formed with a first abutment 550, and the second cutting portion 56 of each of the two blades 51 of the blade assembly 50 has a side formed with a second abutment 560.

Each of the two blades 51 of the blade assembly 50 has a mediate portion formed with a pivot portion 52 formed with a recess 53 formed with a locking hole 54. A torsion spring 57 is mounted between the two blades 51 of the blade assembly 50 and has two ends each formed with an insert 58 inserted into the locking hole 54 of a respective one of the two blades 51 of the blade assembly 50. The two blades 51 of the blade assembly 50 are pivotally connected with each other by the pivot portions 52 thereof.

The first handle 20 of the handle assembly 10 is provided with a protruding catch block 22 selectively rested on either one of the first abutment 550 (see FIG. 5) and the second abutment 560 (see FIG. 3) of a respective one of the two blades 51 of the blade assembly 50, and the second handle 30 of the handle assembly 10 is provided with a protruding catch block 32 selectively rested on either one of the first abutment 550 (see FIG. 5) and the second abutment 560 (see FIG. 3) of a respective one of the two blades 51 of the blade assembly 50.

The end portion of the first handle 20 is formed with two opposite side walls 21 each formed with a pivot portion 24, the end portion of the second handle 30 is formed with two opposite side walls 31 each formed with a pivot portion 35, a pivot shaft 25 is extended through the pivot portion 24 of each of the two opposite side walls 21 of the first handle 20, the pivot portion 35 of each of the two opposite side walls 31 of the second handle 30, the pivot portion 52 of each of the two blades 51 and the torsion spring 57, so that the first handle 20, the second handle 30 and the two blades 51 are pivotally connected with each other. In addition, the pivot portion 52 of each of the two blades 51 is located in the pivot portion 35 of the second handle 30, and the pivot portion 35 of the second handle 30 is located in the pivot portion 24 of the first handle 20.

One of the two opposite side walls 31 of the second handle 30 is formed with a plurality of locking recesses 36, and one of the two opposite side walls 21 of the first handle 20 is formed with a stepped slide slot 23 having a plurality of locking grooves 230.

A locking mechanism 26 is mounted between the first handle 20 and the second handle 30 and includes a push block 27 movably mounted in the slide slot 23, a locking block 29 secured on the push block 27 to move therewith and detachably locked in either one of the locking recesses 36 of the second handle 30 to lock the second handle 30 on the first handle 20, and a positioning plate 28 secured on the push block 27 to move therewith and having at least one locking boss 280 detachably locked in either one of the locking grooves 230 of the first handle 20 to position the push block 27 on the first handle 20.

Figure 4:
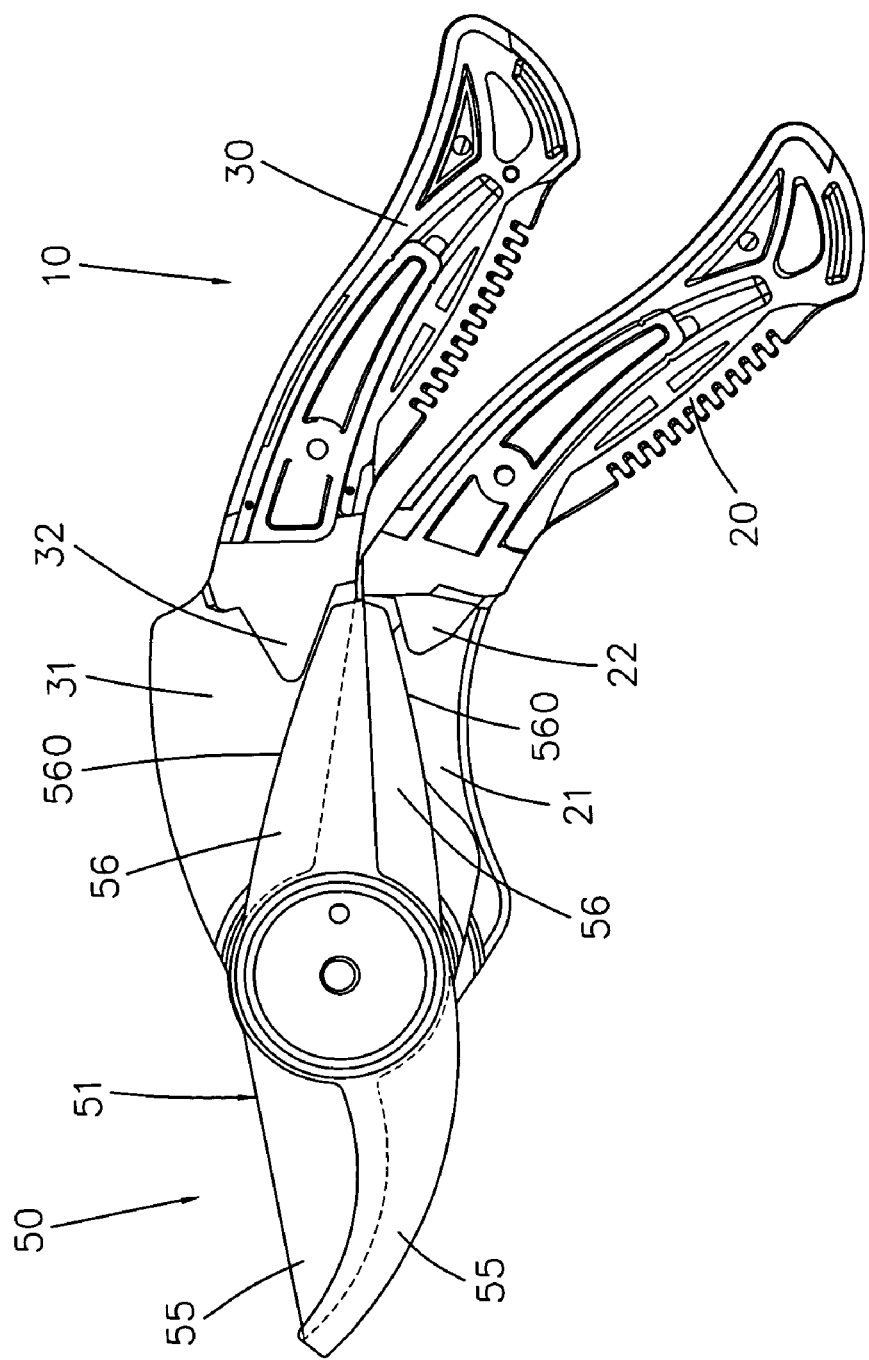
FIG. 4 is a schematic operational view of the gardening shears as shown in FIG. 3 in use.

Referring to FIGS. 1–4, each of the first handle 20 and the second handle 30 is rested on the second cutting portion 56 of a respective one of the two blades 51 to expose the first cutting portion 55 of each of the two blades 51, so that each of the catch block 22 of the first handle 20 and the catch block 32 of the second handle 30 is rested on the second abutment 560 of the second cutting portion 56 of the respective blade 51. At this time, the first cutting portions 55 of the two blades 51 are moved outward by the elastic force of the torsion spring 57 as shown in FIG. 3 to open the two blades 51 of the blade assembly 50. Thus, when the first handle 20 and the second handle 30 are pressed toward each other, the first cutting portions 55 of the two blades 51 are moved toward each other to overcome the elastic force of the torsion spring 57 to close the two blades 51 of the blade assembly 50 as shown in FIGS. 4 to perform a first pruning action.

Figure 6:
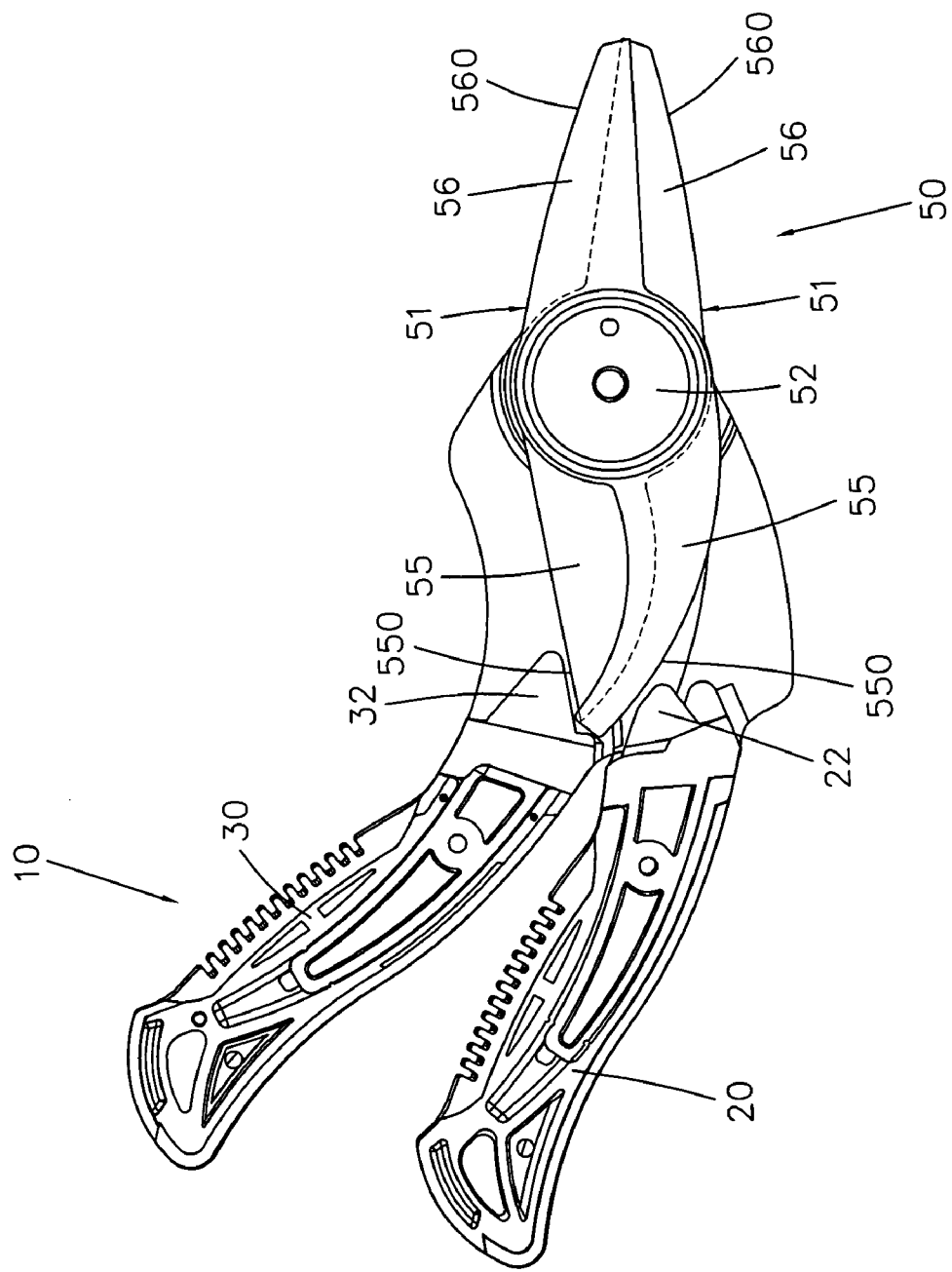
FIG. 6 is a schematic operational view of the gardening shears as shown in FIG. 5 in use.

Referring to FIGS. 5 and 6 with reference to FIGS. 1–4, the first handle 20 and the second handle 30 are pivoted relative to the two blades 51 of the blade assembly 50 to move from the position as shown in FIG. 3 to the position as shown in FIG. 5 where each of the first handle 20 and the second handle 30 is rested on the first cutting portion 55 of a respective one of the two blades 51 to expose the second cutting portion 56 of each of the two blades 51, so that each of the catch block 22 of the first handle 20 and the catch block 32 of the second handle 30 is rested on the first abutment 550 of the first cutting portion 55 of the respective blade 51. At this time, the second cutting portions 56 of the two blades 51 are moved outward by the elastic force of the torsion spring 57 as shown in FIG. 5 to open the two blades 51 of the blade assembly 50. Thus, when the first handle 20 and the second handle 30 are pressed toward each other, the second cutting portions 56 of the two blades 51 are moved toward each other to overcome the elastic force of the torsion spring 57 to close the two blades 51 of the blade assembly 50 as shown in FIG. 6 to perform a second pruning action.

Accordingly, the gardening shears have two blades each having two cutting portions having different shapes to perform different cutting functions, so that the gardening shears provide two different pruning actions so as to satisfy the user's practical requirements, thereby enhancing the versatility of the gardening shears. In addition, the first handle 20 and the second handle 30 are pivoted relative to the two blades 51 to expose the first cutting portion 55 or the second cutting portion 56 of each of the two blades 51, so that the user can change the first cutting portion 55 and the second cutting portion 56 of each of the two blades 51 easily and conveniently, thereby facilitating the user operating the gardening shears.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A pair of gardening shears, comprising:

a blade assembly including two blades pivotally connected with each other; and a handle assembly pivotally mounted on the blade assembly and including a first handle having an end portion pivotally mounted on the two blades of the blade assembly, and a second handle having an end portion pivotally mounted on the two blades of the blade assembly and pivotally connected to the end portion of the first handle; wherein each of the two blades of the blade assembly has a mediate portion formed with a pivot portion formed with a recess formed with a locking hole, and the blade assembly further includes a torsion spring mounted between the two blades and having two ends each formed with an insert inserted into the locking hole of a respective one of the two blades;

the end portion of the first handle is formed with two opposite side walls each formed with a pivot portion, the end portion of the second handle is formed with two opposite side walls each formed with a pivot portion, and the handle assembly further includes a pivot shaft extended through the pivot portion of each of the two opposite side walls of the first handle, the pivot portion of each of the two opposite side walls of the second handle, the pivot portion of each of the two blades and the torsion spring, so that the first handle, the second handle and the two blades are pivotally connected with each other;

one of the two opposite side walls of the second handle is formed with a plurality of locking recesses, one of the two opposite side walls of the first handle is formed with a stepped slide slot having a plurality of locking grooves, and the handle assembly further includes a locking mechanism mounted between the first handle and the second handle and including a push block movably mounted in the slide slot, a locking block secured on the push block to move therewith and detachably locked in either one of the locking recesses of the second handle to lock the second handle on the first handle.

2. The gardening shears in accordance with claim 1, wherein each of the two blades of the blade assembly has a first end formed with a first cutting portion and a second end formed with a second cutting portion.

3. The gardening shears in accordance with claim 2, wherein the handle assembly is pivotable on the blade assembly between a first position where each of the first handle and the second handle of the handle assembly is rested on the second cutting portion of a respective one of the two blades of the blade assembly to expose the first cutting portion and a second position where each of the first handle and the second handle of the handle assembly is rested on the first cutting portion of a respective one of the two blades of the blade assembly to expose the second cutting portion.

4. The gardening shears in accordance with claim 2, wherein the first cutting portion of each of the two blades of the blade assembly has a side formed with a first abutment, the second cutting portion of each of the two blades of the blade assembly has a side formed with a second abutment, the first handle of the handle assembly is provided with a protruding catch block selectively rested on either one of the first abutment and the second abutment of a respective one of the two blades of the blade assembly, and the second handle of the handle assembly is provided with a protruding catch block selectively rested on either one of the first abutment and the second abutment of a respective one of the two blades of the blade assembly.

5. The gardening shears in accordance with claim 1, wherein the two blades of the blade assembly are pivotally connected with each other by the pivot portions thereof.

6. The gardening shears in accordance with claim 1, wherein the pivot portion of each of the two blades is located in the pivot portion of the second handle.

7. The gardening shears in accordance with claim 1, wherein the pivot portion of the second handle is located in the pivot portion of the first handle.

8. The gardening shears in accordance with claim 1, wherein the locking mechanism further includes a positioning plate secured on the push block to move therewith and having at least one locking boss detachably locked in either one of the locking grooves of the first handle to position the push block on the first handle.

\* \* \* \* \*